United States Patent [19]
Buss et al.

[11] 3,852,190
[45] Dec. 3, 1974

[54] REFORMING WITH PLATINUM ON ALUMINA DERIVED FROM A BYPRODUCT OF A ZIEGLER PROCESS

[75] Inventors: Waldeen C. Buss, Richmond; Harris E. Kluksdahl, San Rafael, both of Calif.

[73] Assignee: Chevron Research Company, San Francisco, Calif.

[22] Filed: Oct. 27, 1972

[21] Appl. No.: 301,696

[52] U.S. Cl............. 208/138, 252/466 PT, 423/628
[51] Int. Cl............................................. C10g 35/08
[58] Field of Search........ 208/138, 139; 252/466 PT; 423/628

[56] References Cited
UNITED STATES PATENTS

| | | | |
|---|---|---|---|
| 2,762,782 | 9/1956 | Kimberlin et al. | 252/466 PT |
| 2,892,858 | 6/1959 | Ziegler | 260/448 |
| 2,905,632 | 9/1959 | Gladrow et al. | 252/466 PT |

OTHER PUBLICATIONS
Butler et al., "Production of High Purity Alumina by the Hydrolysis of Aluminum Alkoxides," preprint 8-D, March, 16–20, AICHE Meeting.
Conoco Bulletin of Jan. 19, 1971 on "Catapal Aluminas."

*Primary Examiner*—Herbert Levine
*Attorney, Agent, or Firm*—G. F. Magdeburger; R. H. Davies

[57] ABSTRACT

A process for reforming a naptha feedstock by contacting the feedstock at reforming conditions with a catalyst containing 0.01 to 5 weight per cent platinum disposed on an alumina support wherein the alumina is obtained by removing water from aluminum hydroxide produced as a byproduct from a Ziegler higher alcohol synthesis reaction and wherein the alumina is calcined so as to have a surface area of 140–240 square meters per gram. Preferably the catalyst also contains rhenium disposed on said byproduct alumina. Preferably the alumina is calcined at a temperature between about 1,150° and 1,300°F. prior to disposing the platinum and/or rhenium on the alumina.

3 Claims, No Drawings

REFORMING WITH PLATINUM ON ALUMINA DERIVED FROM A BYPRODUCT OF A ZIEGLER PROCESS

BACKGROUND OF THE INVENTION

The present invention relates to catalysts such as reforming catalysts and to catalytic naphtha reforming processes. The present invention relates especially to a particular alumina for use in catalysts such as reforming catalysts.

TABLE I

Nomenclature of Crystallized Hydrates of Alumina

| Composition | Alcoa | European Symposium |
|---|---|---|
| $Al_2O_3 \cdot 3H_2O$ | α-alumina trihydrate | hydrargillite or gibbsite |
| | β-alumina trihydrate | bayerite |
| | new β-trihydrate | nordstrandite |
| $Al_2O_3 \cdot H_2O$ | α-alumina monohydrate | boehmite |
| | β-alumina monohydrate | diaspore |

TABLE II

Thermal and Hydrothermal Transformations of Alumina

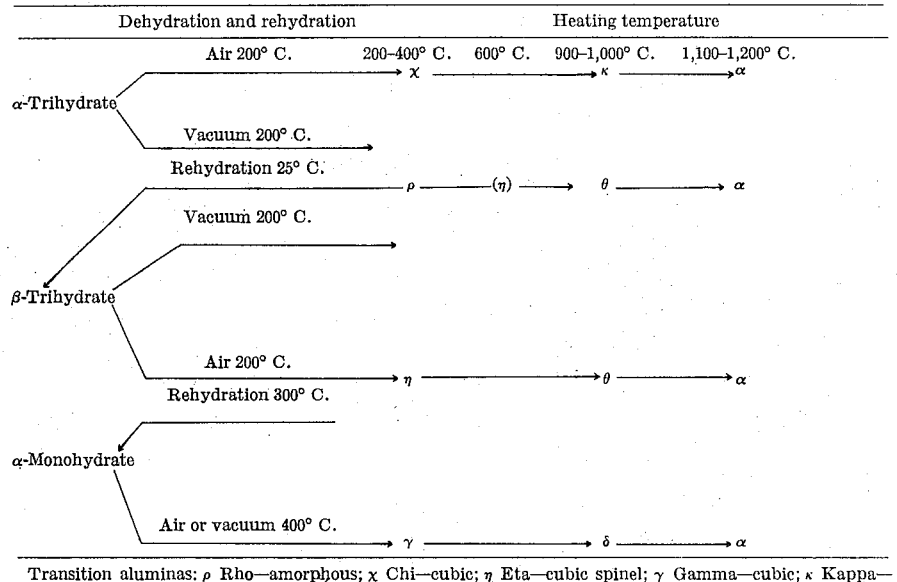

Transition aluminas: ρ Rho—amorphous; χ Chi—cubic; η Eta—cubic spinel; γ Gamma—cubic; κ Kappa—orthorhombic; θ Theta—monoclinic; δ Delta—orthorhombic.

It is well known in the catalytic reforming of petroleum hydrocarbons in the presence of hydrogen, which reforming is frequently called hydroforming, that complex chemical reactions occur. Thus, when petroleum hydrocarbon fractions such as those boiling in the gasoline range, particularly between about pentane and 450°F., are mixed with hydrogen and passed over a platinized alumina catalyst at a temperature of about 600°–1100°F. and pressure of about 25–500 p.s.i., i.e., at reforming conditions, their fuel value in an internal combustion engine is materially improved. This is due to a number of reactions which take place simultaneously, including an isomerization reaction, dehydrocyclization and aromatization reactions and also a hydrocracking reaction.

Because of the economic advantage derived from improving the activity and operating life of reforming catalysts, there is continual research directed toward improving such catalysts and improving catalytic reforming processes. Currently, virtually all of the catalytic reforming catalysts contain alumina as a major component of the catalyst. The alumina is usually first produced in a hydrated form and then subsequently calcined to a substantially dehydrated form before using the alumina-containing catalyst in catalytic reforming.

The various types of hydrated alumina and transition forms of alumina can be indicated as below in Tables I and II.

Table II is based on an article by R. Tertian and D. Pappee, J. Chim. Phys. 55, 341 (1958).

The most frequently preferred alumina for use in reforming catalysts is gamma alumina. As can be seen from Table II, there are various ways to obtain gamme alumina. Although there are various ways of preparing the alumina hydrate from which the gamma alumina can in turn be prepared, most frequently the hydrated alumina is formed by making an alumina "gel." The name "gel" is applied to preparations of alumina which are amorphous, or mainly amorphous, hydrated forms obtained by starting from solutions of aluminum salts or of alkaline aluminates.

"Sol" is usually the term applied to liquid colloidal solutions which upon partial dehyration become solid gels.

U.S. Pat. No. 3,280,041 mentions two general methods of preparing hydrated alumina. One method is referred to as "precipitated aluminas" by which is meant the aluminas formed by the addition of an acid or acid salt such as sulfuric acid, hydrochloric acid or any of the alums (aluminum sulfate containing a varying number of moles of water of hydration) to an alkali metal aluminate such as sodium or potassium aluminate.

Another type of hydrated alumina is referred to as the "Heard-type alumina sol," by which is meant the alumina sols prepared by the digestion of metallic aluminum by the action of acetic or equivalent acid in the presence of mercury of other amalgamating agents.

Such sols and their methods of preparation are described in U.S. Pat. No. 2,258,099, Reissue Pat. No. 22,196 or U.S. Pat. No. 2,274,634.

Still another method of making alumina is by dissolving aluminum in an alcohol to form an aluminum alcoholate or an aluminum alkoxide, followed by hydrolyzing the aluminum alkoxide to form an alcohol and an aluminum hydroxide or hydrated alumina paste. Water is removed from the aluminum hydroxide to obtain alumina. To aid in dissolving the chunks of aluminum metal or aluminum turnings in the alcohol, a small amount of mercuric chloride is generally used. This method in general is an old method, but improvements relating to it are described in U.S. Pat. Nos. 2,636,865; 2,762,782; 2,762,783; 2,905,632; and 3,006,864.

Parenthetically, it can be mentioned that the alumina produced in accordance with the previously cited patents covers a cited range of surface areas and wide range of calcination temperatures, specifically from 356 meters squared per gram surface area to about 170 meters squared per gram, and calcination temperatures from about 850°F. to about 1,200°F.

The present invention is concerned with alumina obtained by a method somewhat similar to the last mentioned patents wherein alumina is produced by a method involving reacting aluminum with an alcohol to form an aluminum alkoxide. The alumina used in the present invention is a byproduct from Ziegler higher alcohol synthesis reactions. Ziegler alcohol synthesis reactions are described, for example, in Karl Ziegler's U.S. Pat. No. 2,892,858. The general method of synthesis can be indicated as follows:

The first step is the preparation of triethylaluminum from aluminum, hydrogen, and ethylene. This is carried out in two stages with recycle of two-thirds of the product, triethylaluminum.

$$Al + 3/2 H_2 + 2\ Al(C_2H_5)_3 \rightarrow 3\ Al(C_2H_5)_2H$$

$$3\ Al(C_2H_5)_2H + 3\ C_2H_4 \rightarrow 3\ Al(C_2H_5)_2$$

In the polymerization step ethylene is added.

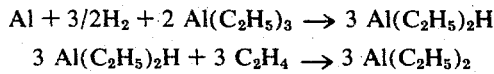

The oxidation step converts this product to an aluminum alkoxide.

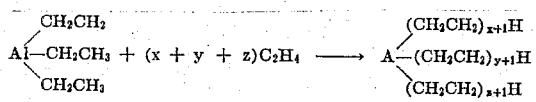

The alcohols are then formed by a hydrolysis step.

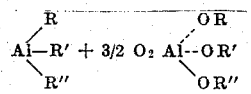

As pointed out in Example 1 of U.S. Pat. No. 2,892,858, alumina of high purity can be obtained by the removal of water from the aluminum hydroxide paste which is obtained from the hydrolysis step.

The alumina obtained as a byproduct from the Ziegler alcohol synthesis reaction has been suggested for use in catalytic reforming catalysts, for example, in a paper given by R. J. Butler et al., titled "Production of High Purity Alumina by the Hydrolysis of Aluminum Alkoxides," preprint 8-D, Mar. 16–20, 1969, AICHE meeting. It is also pointed out in the Butler et al. article that in one unidentified type of commercial operation a catalyst made from Catapal alumina (Catapal is a trademark name for the alumina) showed longer possible life than a catalyst previously used in that operation.

The Ziegler reaction byproduct aluminas are also described in a Conoco Bulletin of Jan. 19, 1971, on "Catapal Aluminas." This bulletin describes Catapal alumina SB having a surface area of 250 square meters per gram and Catapal N having 180 square meters per gram. The bulletin points out that ". . . in one commercial operation Catapal SB [250 m²/g] alumina's greater activity has allowed operation at 25°–30°C. lower temperature, decreasing coking enough to extend on-stream time [catalyst life] by a factor of three." Also, as pointed out in the Bulletin, both the Catapal SB and Catapal N are calcined for 3 hours at 900°F.

Although there have been suggestions that byproduct alumina from Ziegler alcohol synthesis may be used to make catalysts of improved life or lower fouling rate, our initial attempts to use such byproduct alumina resulted in catalysts which were inferior to similar catalysts' compositions except for the method of obtaining the alumina.

SUMMARY

According to the present invention a process is provided for reforming a naphtha feedstock which comprises contacting the feedstock at reforming conditions with a catalyst comprising 0.01 to 5 weight percent platinum disposed on an alumina support wherein the alumina is obtained by removing water from aluminum hydroxide produced as a byproduct from a Ziegler higher alcohol synthesis reaction and wherein the alumina is calcined so as to have a surface area of 140–240 square meters per gram.

Preferably the alumina is calcined so as to have a surface area of 165 to 215 square meters per gram. Usually we prefer to calcine the alumina after it has been formed into a catalyst carrier particle, for example, formed into a sphere or formed by extrusion into a pellet. However, alternatively, the alumina can be calcined after additional catalytic components such as platinum are added to the alumina. Usually the alumina is calcined both before and after metals such as platinum are added.

In the reforming process of the present invention it is particularly preferred, in order to achieve low fouling rates, to use a catalyst which contains 0.01 to 5 weight percent rhenium disposed on the alumina in addition to the platinum disposed on the alumina. It is to be understood that the platinum and/or rhenium can be present either in the elemental form or in the compound form, as for example in the sulfide or oxide form.

We have found that certain calcination temperatures result in a catalytic reforming catalyst which gives especially low fouling rates. The calcination temperatures which we have found to give this advantage are between 1,150° and 1,350°F., preferably between 1,200° and 1,300°F. The calcination time should be between about 1 and 24 hours, preferably between one and 5 hours, for example about 2 hours.

Thus, among other factors, the present invention is based on our finding that an unexpectedly low fouling rate is obtained in catalytic reforming if the Ziegler reaction byproduct alumina is calcined to a surface area between 140 and 240 square meters per gram, preferably between 165 and 215 square meters per gram. The present invention is also based on our finding that calcination temperatures between about 1,150° and 1,350°F., preferably between 1,200° and 1,300°F., results in a low fouling rate catalyst, particularly for a platinum and rhenium containing catalyst.

In addition to the reforming process embodiments, as referred to above, the present invention also encompasses the catalyst composition used in the reforming process embodiments.

The term "platinum," as used herein, embraces substantial equivalents of platinum, such as palladium or iridium.

FURTHER DESCRIPTION

Table III below shows the relative fouling rates for several reforming catalysts. By "fouling rate" is meant the temperature increase per hour which is necessary to maintain a given product octane from catalytic reforming. Thus, if a catalytic reforming operation is carried out to produce a 90-octane $C_5+$ product, and the start of run temperature with fresh reforming catalyst is 850°F., and the end of run temperature with fouled catalyst is 950°F. after 10,000 hours of operation, then the fouling rate is 100°F. ÷ 10,000 hours which equals 0.01°F. per hour. If for one run a fouling rate of 0.01°F./hr was obtained and in another run a fouling rate of 0.02°F./hr. was obtained, then the relative fouling rate of the second run compared to the first run would be two.

The paste was then extruded through a 1/16 inch die on a ram-type extruder. The wet extrudate was dried at 1,250°F. until no additional weight loss occurred. It was then further dried at 500°F. in air and calcined 2 hours in dry air at 1,250°F.

The operating conditions for the "S" runs of Table III were chosen to accelerate catalyst fouling so that comparisons between catalysts can be made in 1–2 days. The feed was a hydrofined naphtha of boiling range 151–428°F. containing 36.5 volume percent paraffins. The runs were made at 80 psig pressure, 3.0 LHSV, 5.3 hydrogen to hydrocarbon mol ratio, and the temperature was adjusted to maintain constant octane product of about 102 octane number.

The operating conditions for the "P" runs of Table III were also accelerated conditions, as follows: 100 psig pressure, 3.0 LHSV, 3.0 $H_2$/HC mol ratio, 101 F–1 clear octane severity for product reformate.

As can be seen from Table III, the catalysts prepared from the Ziegler alcohol synthesis byproduct alumina were found to have relatively lower fouling rates than for catalysts prepared on more expensive, currently commercially used alumina, provided the Ziegler reaction byproduct alumina had a surface area and/or was calcined in accordance with the present invention.

In the present invention the catalyst used in the reforming process must have a surface area between 140 and 240 square meters per gram, preferably between

TABLE III

| RUN NUMBER | CATALYST COMPOSITION | APPROXIMATE SURFACE AREA | APPROXIMATE CALCINATION TEMPERATURE | RELATIVE FOULING RATE |
|---|---|---|---|---|
| P-1 | 0.2 Pt, 0.2 Re, $Al_2O_3$ | 200 | — | 1.6 |
| P-2 | 0.2 Pt, 0.2 Re, Z-$Al_2O_3$ | 200 | — | 1.4 |
| P-3 | 0.2 Pt, 0.2 Re, Z-$Al_2O_3$ | 200 | — | 1.0 |
| S-1 | 0.2 Pt, 0.2 Re, $Al_2O_3$ | 200 | 1500°F. | 1.5 |
| S-2 | 0.2 Pt, 0.2 Re, Z-$Al_2O_3$ | 200 | 1250°F. | 1.0 |
| P-4 | 0.3 Pt, 0.3 Re, $Al_2O_3$ | 200 | — | 1.0 |
| P-5 | 0.3 Pt, 0.3 Re, Z-$Al_2O_3$ | 200 | — | 0.8 |

In Table III the alumina designated by the prefix "Z" is made from byproduct alumina from a Ziegler alcohol synthesis reaction. The catalysts that were not made with the Z-alumina were made with commercial catalyst grade alumina of very high quality: that is, alumina which is currently in use in commercial reforming catalysts. The catalysts made with Z-alumina were made starting from Conoco's Catapal Alumina. The Catapal alumina is a byproduct of a German plant for the production of alcohols and the production of the Catapal alumina is described in the Conoco Bulletin referred to above under "Background of the Invention."

The Catapal alumina typically is extruded after it was mulled up with water and nitric acid, and preferably with the inclusion of an organic lubricant to facilitate the extrusion. The use of nitric acid and organic lubricants in alumina extrusion methods is described for example in U.S. Pat. No. 3,361,682.

Preferred extruding conditions for the Z-alumina include the following: 3,411 g. Catapal alpha alumina monohydrate RB–14 base, 1,650 ml distilled $H_2O$, and 125 ml of 0.001 M nitric acid were thoroughly mulled for one-half hour in a Simpson muller-mixer. The volatile content was 43 percent by weight as measured by the Ohaus method (900°F. calcination temperature).

165 and 215 square meters per gram. Also, we have found that the alumina should be calcined at a temperature between 1,150° and 1,350°F., preferably between 1,200° and 1,300°F. However, we believe the required surface area may be achieved by other calcination temperatures for different lengths of time or in the presence of steam or other agents which affect the surface area of the alumina, although we regard 900°F. calcination for three hours in air to be unsuitable for purposes of obtaining the catalyst used in the reforming process of the present invention.

A correlation between calcination temperature and surface area is given in Table IV for Ziegler alcohol synthesis byproduct alumina calcined for two hours in air.

TABLE IV

| Calcination Temperature, °F. | Surface Area, $m^2/g$ |
|---|---|
| 1100 | 241 |
| 1200 | 194 |
| 1400 | 175 |
| 1600 | 150 |

As previously indicated, we have found relatively low fouling rates for the catalyst used in catalytic reforming when the catalyst is calcined at 1,150°–1,350°F., preferably 1,200° to 1,350°F. Data supporting this finding is shown in Table V. It can be noted by plotting the data from Table V that for Ziegler reaction byproduct alumina, calcination temperatures within the 1,150° to 1,350°F. range and preferably 1,200° to 1,300°F., result in a relatively advantageous catalyst for catalytic reforming.

The catalysts upon which the data in Table V is based were prepared by impregnating platinum and rhenium onto calcined Ziegler reaction byproduct alumina. Additional data, as shown in Table VI, on the effect of calcination temperatures for Ziegler reaction byproduct alumina was obtained for catalysts prepared by mulling the platinum and rhenium components into the alumina before extruding and calcining the alumina. The platinum and rhenium were mulled into the alumina in the form of chlorplatinic acid and perrhenic acid, respectively.

TABLE V

| Calcination Temperature, °F. | Relative Fouling Rate |
|---|---|
| 1100 | 1.6 |
| 1200 | 1.2 |
| 1400 | 1.2, 1.3 |
| 1600 | 1.6 |

TABLE VI

| Calcination Temperature, °F. | Relative Fouling Rate |
|---|---|
| 700 | 3.0 |
| 900 | 1.4 |
| 950 | 1.8 |
| 1100 | 2.3 |

As can be seen from Table VI, in this instance the fouling rate of the catalyst was found to be most advantageous when calcined at about 900°F. However, this catalyst, prepared by mulling the platinum and rhenium into the alumina, was in general not as attractive a catalyst as the catalyst produced by disposing platinum and/or rhenium onto an extruded alumina support as is the case for the catalysts which generated the data shown in Table V.

Calcination temperatures covering the complete gamut from about 500° to 2000°F. are disclosed at various places in the literature, but it is of course important in the present invention that the calcination is taken into context as applied to a specific alumina, that is, alumina obtained as a byproduct from a Ziegler reaction.

For example, U.S. Pat. No. 3,459,681 discloses calcination temperatures from 428°F. to 1,562°F. with a preferred calcination temperature being about 1,000°F. to 1,150°F. However, this patent is concerned with gamma aluminas in general, including gamma aluminas derived from the Heard alumina sol Process, as referred to above under "Background of the Invention." Also, as per the examples in the patent, the calcination is actually carried out at about 1,100°F.

In the present invention we prefer that the Ziegler reaction byproduct alumina is calcined at our aforesaid calcination temperatures before the platinum and/or rhenium are disposed on the alumina carrier. However, a portion or all of the platinum and/or rhenium can be combined with the alumina before the alumina is calcined at the previously stated calcination temperatures which embrace about 1,250°F. Also, it is usually desirable to calcine the catalyst at an elevated temperature above 500°F. after the platinum and/or rhenium components have been added to the aluminum carrier, even in those instances where the alumina carrier has been previously calcined.

As indicated previously in the discussion under "Background of the Invention," the use of the term "Ziegler reaction byproduct alumina" is meant to apply to alumina derived as a byproduct from alcohol synthesis using a process along the lines of the previously cited Ziegler U.S. Pat. No. 3,292,858 wherein alcohols are formed by hydrolyzing an aluminum alkoxide with water resulting in the formation of aluminum hydroxide, which alumina hydroxide can be converted to a Ziegler reaction byproduct alumina by removal of water.

The catalysts used to obtain the data of Table V were made by mulling Catapal alumina with $HNO_3$, extruding, calcining at the specified temperature, then coimpregnating Pt, Re and Cl, and finally calcining at 700°F.

The catalysts used to obtain the data of Table VI were made by mulling Catapal alumina with chloroplatinic acid, perrhenic acid, hydrochloric acid in water, extruding, then calcining at the specified temperature.

The operating conditions used to generate the data of Tables V and VI were chosen to accelerate fouling so that catalyst comparisons can be made in 1–2 days. The feed was a hydrofined naphtha of boiling range 151–428°F. containing 36.5 volume percent paraffins. The runs were made at 160 psig pressure, 4.0 LHSV, 4.0 hydrogen to hydrocarbon mol ratio and the temperature was adjusted to maintain constant octane product of about 99 octane number.

What is claimed is:

1. A process for reforming a naptha feedstock which comprises contacting the feedstock at reforming conditions with a catalyst comprising 0.01 to 5 weight percent platinum disposed on an alumina support wherein the alumina is obtained by removing water from aluminum hydroxide produced as a byproduct from a Ziegler higher alcohol synthesis reaction and wherein the alumina is calcined at 1,150° to 1,350°F. so as to have a surface area of 165–215 square meters per gram.

2. A process in accordance with claim 1 wherein the catalyst further comprises 0.01 to 5 weight percent rhenium disposed on the alumina.

3. A process in accordance with claim 1 wherein the alumina is calcined at 1,200°–1,300°F from about 1 to 24 hours.

* * * * *